United States Patent [19]

Chiu

[11] Patent Number: 4,572,098
[45] Date of Patent: Feb. 25, 1986

[54] LIQUID SMOKE-IMPREGNATION OF FIBROUS FOOD CASINGS

[75] Inventor: Herman S. Chiu, Chicago, Ill.

[73] Assignee: Union Carbide Corporation, Danbury, Conn.

[21] Appl. No.: 415,862

[22] Filed: Sep. 8, 1982

Related U.S. Application Data

[62] Division of Ser. No. 301,276, Sep. 11, 1981, Pat. No. 4,377,606.

[51] Int. Cl.⁴ .................. B05C 3/12; B05C 5/00; B05C 11/02
[52] U.S. Cl. ..................... 118/33; 118/117; 118/235; 118/325; 118/419
[58] Field of Search .............. 118/33, 109, 235, 419, 118/424, 325, 117; 427/177, 179; 242/75.2

[56] References Cited

U.S. PATENT DOCUMENTS

| Re. 8,145 | 3/1878 | Bullock | 118/325 |
|---|---|---|---|
| 564,353 | 7/1896 | Wagg | 118/419 X |
| 2,309,090 | 1/1943 | Bauer et al. | 427/179 |
| 2,672,119 | 3/1954 | Ertner | 118/118 X |
| 3,875,900 | 4/1975 | Warner et al. | 118/33 X |
| 3,931,786 | 1/1976 | Teed | 118/235 |
| 4,174,368 | 11/1979 | Chiu | 264/561 |
| 4,377,606 | 3/1983 | Chiu | 427/172 |

FOREIGN PATENT DOCUMENTS

1099326 2/1961 Fed. Rep. of Germany .
341477 1/1931 United Kingdom ............. 118/118

OTHER PUBLICATIONS

Red Arrow Products Co.; *Smoke Flavoring Directory* (1979), p. 12.
Engineering Staff, Mount Hope Machinery Co.; *Fundamentals of Automatic Tension Control of Moving Webs*, The Paper Industry, Oct., 1963, p. 370.

*Primary Examiner*—Evan K. Lawrence
*Attorney, Agent, or Firm*—John C. Lefever; Real J. Grandmaison

[57] ABSTRACT

Apparatus for manufacturing a liquid smoke impregnated casing comprising an unwind shaft adapted to have a roll of casing, a tension dancer roll to control the tension on the casing, an unwind roll brake co-acting with the unwind shaft and controlled by a dancer roll-operated regulator, edge guiding means to align the casing to a liquid smoke contacting means, a rewind shaft mounted with a roll core for rewinding the casing, side plates on the rewind shaft to align successive layers of the casing, means to spin the rewound roll of casing, and a rider squeeze roll for contacting the casing during the spinning of the casing.

13 Claims, 3 Drawing Figures

LIQUID SMOKE-IMPREGNATION OF FIBROUS FOOD CASINGS

This application is a division of our prior U.S. application Ser. No. 301,276 filed 9/11/1981, U.S. Pat. No. 4,377,606.

BACKGROUND OF THE INVENTION

This invention relates to an apparatus for manufacturing a tar-containing liquid smoke impregnated casing of the fibrous reinforced dry stock cellulosic type.

Surface appearance and flavor are important factors in the commercial and consumer acceptance of processed meat products, and a common feature of most varieties of such products involves the use of "smoking" for imparting characteristic flavor and color thereto. The "smoking" of food products has been generally accomplished by subjecting the food product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of liquid aqueous solutions of wood-derived smoke constituents, commonly called "liquid smoke solutions", in the processing of many types of meat and other food products.

The application of "liquid smoke solutions" to meat products is generally carried out in a variety of ways, including spraying or dipping an encased food product during the processing thereof, but this is not completely satisfactory because of inability to uniformly treat the encased product. Another method is to incorporate the liquid smoke solution in the recipe itself, but this does not always provide the desired surface appearance because of dilution of smoke ingredients. Also, incorporation of liquid smoke in the recipe reduces the stability of the meat emulsion, and will adversely affect taste if high concentrations are used. Spray or dip application of liquid smoke to encased food products also causes unwanted pollution and equipment corrosion problems for the food processor. In addition, encased sausages treated by application of the liquid smoke during commercial processing have been found to yield sausages which are lacking in smoke color uniformity between different sausages from the same processed group. Even more undesirable is the lack of color uniformity which often appears on the surface of the same sausage, such as light and dark streaks or blotches, and even uncolored spots particularly at the sausage ends.

It has been found that casings which afford special treatment or structural characteristics to the food product can be more uniformly and economically supplied by the casing manufacturer.

Several methods of providing food casings with coatings applied to a surface thereof are known, as for example the spraying method for applying coating materials over the internal surface of small diameter casings. Another method is described in U.S. Pat. No. 3,378,379 to Shiner et al., describing a "slugging" method for applying materials to the internal surface of large diameter casings. While these and other techniques have been used in commercial preparation of coated food casings, including liquid smoke containing coatings, to the best of my knowledge, none of these prior art coated casings have been commercially succesful in imparting a consumer-acceptable level of "smoke" flavor and color to a meat product processed therein.

I have also found by experiments that internal coating of casings with liquid smoke during the casing manufacture is not successful due to the inability to apply a uniform distribution of liquid smoke at the necessary loading level (smoke quantity) and at an efficient operating speed.

One object of this invention is to provide a method for manufacturing a liquid smoke impregnated food casing which is capable of imparting uniform smoke color, smoke flavor, and smoke odor to food processed inside the casing.

Other objects and advantages of the invention will become apparent from the ensuing disclosure and appended claims.

SUMMARY OF THE INVENTION

In this invention, an apparatus is provided for carrying out a method of manufacturing a wood-derived liquid smoke impregnated fibrous cellulosic food casing. In the method, a dry stock fibrous cellulosic food casing is provided in the flat form along with a source of wood-derived liquid smoke having color, odor and flavor constituents. The flat fibrous casing is moved through a liquid smoke coating zone and at least one outer surface of the moving fibrous flat casing is contacted with the liquid smoke under conditions to coat the surface but not substantially impregnate the casing wall. The liquid smoke coated flat casing is moved from the contacting zone to a reeling zone and is wound therein into a rotating roll of overlying layers under conditions sufficient to trap the liquid smoke coating between adjacent layers of casing in the roll. The rotation of the liquid smoke coated casing roll is continued under conditions such that at least a portion of the liquid smoke impregnates each layer wall of the casing.

In one preferred embodiment, the flat casing-liquid smoke contacting is under conditions including a contact time less than that required for substantial impregnation, and a casing speed sufficient for retention of the liquid smoke as a substantially uniformly distributed liquid film on the outer surface. This liquid film is sandwiched between adjacent layers in the reeling zone, and sufficient inward radial force is applied on the casing entire edge-to-edge outer surface of the rotating roll to squeeze excess liquid from the roll layers. The rotation speed of the liquid film-containing roll is maintained sufficiently low to retain the substantially uniform liquid film distribution between the casing layers.

In a more preferred embodiment, the casing has a first end which is wound from a feed roll as the innermost layer of the rotating roll under tension, and a second reel which is rewound as the outermost layer without tension. On release of the flat casing second end from the feed roll, this untensioned end passes through the coating zone and is thereby coated with a liquid smoke film. This second end is reeled and becomes the outer layers of the take-up roll.

At this point in the more preferred method, two steps are performed simultaneously. A relatively slow rotational speed is imposed on the take-up roll in order to maintain the liquid smoke in a substantially uniform distribution throughout the roll by imposition of centrifugal force sufficient to overcome the effect of gravity. Gravity will otherwise cause the liquid to drain to the lowest regions of the roll. Also, sufficient inward radial force is applied on the casing edge-to-edge outer surface of the slowly rotating roll to squeeze excess liquid smoke from the untensioned roll outer layers. This slow rotation and radial inward force on the roll are continued until the liquid smoke is at least partially absorbed in all layers of the flat casing.

By a preferred embodiment of the method, a fibrous reinforced dry stock cellulosic food casing is provided in the rolled flat form as a first roll, and engaged on a first rotatable shaft. A wood-derived liquid smoke including color, odor and flavor constituents, is provided. A first end of the flat casing is unwound from the first roll and moved through a liquid smoke coating zone where the liquid smoke contacts and coats at least one outer surface of the flat casing first end. The liquid-coated casing first end is withdrawn from the coating zone and wound on a core on a second rotatable shaft.

The second shaft is continuously rotated to unwind the flat casing from the first roll, transport same through the coating zone and rewind the liquid smoke-coated flat casing around the core on the second shaft in a rewind zone to form a second roll. This flat casing unwinding is restrained under a first highest restraining unwind shaft torque so as to impart a constant tension in both the coating zone and the rewind zone. The second roll rewinding is accomplished by a first lowest rewind shaft torque and highest rewind shaft speed, progressing to a final highest rewind shaft torque and lowest rewind shaft speed as the rewind roll diameter increases. The first roll unwinding is continued under progressively lower restraining torque as the first roll diameter diminishes, so as to both maintain the aforementioned constant tension and a constant speed while coating at least the aforementioned one outer surface of the flat casing in the coating zone at a contact time which is less than that required for the liquid smoke to significantly impregnate the casing wall. However, this coating zone contact time is sufficient for retention of the liquid smoke as a liquid film on the coated flat casing. Being under tension, as the flat casing leaves the coating zone and tangentially meets the rewind roll, excess liquid is forced from the flat casing surface, and a controlled amount of uniformly distributed liquid is sandwiched between adjacent layers of the second roll (rewind roll), being only sufficient to achieve the desired absorption loading.

When transfer of the flat casing from the first shaft to the second shaft is nearly completed and the flat casing second end is released from the first shaft, the remaining uncoated portion of the flat casing is no longer under tension. The untensioned second end of the flat casing is pulled through the coating zone and contacted with the liquid smoke, but since this portion of the casing is no longer under tension, when this portion of the casing tangentially meets the rewind roll, an insufficient amount of liquid is forced from the flat casing surface and an excess amount of liquid is sandwiched between adjacent layers of the second roll. An inward radial load is applied across the edge-to-edge outer surface of the second roll of a sufficient magnitude to squeeze this excess liquid smoke from the untensioned outer layers of the second roll.

Rotation of the second roll is continued for a time sufficient to allow the liquid smoke sandwiched between the adjacent casing layers to be substantially absorbed into the cellulosic casing wall. The purpose of the continued rotation is to allow the sandwiched liquid to be maintained in a uniform distribution throughout the roll, notwithstanding the influence of gravity. A relatively low speed of rotation is preferred as compared to the previous rotation speeds when the casing was under tension, for example about 50 to 60 rpm, in order to avoid spinning off the sandwiched liquid smoke by centrifugal force.

Depending upon the amount of liquid smoke to be absorbed, the second roll may be rotated during this slow spin period until absorption is complete, for example 10 minutes. Alternatively the slow spin period may be shorter and the roll may be removed from the shaft and preferably stored in a flat position (the core is vertical) until the absorption is complete. Storing the roll in a vertical position (core is horizontal) has been found to often result in drainage of unabsorbed liquid to the bottom of the roll where absorption then occurs to produce a nonuniform roll of smoke impregnated casing.

DESCRIPTION OF THE PREFERRED EMBODIMENTS

Figure 1:
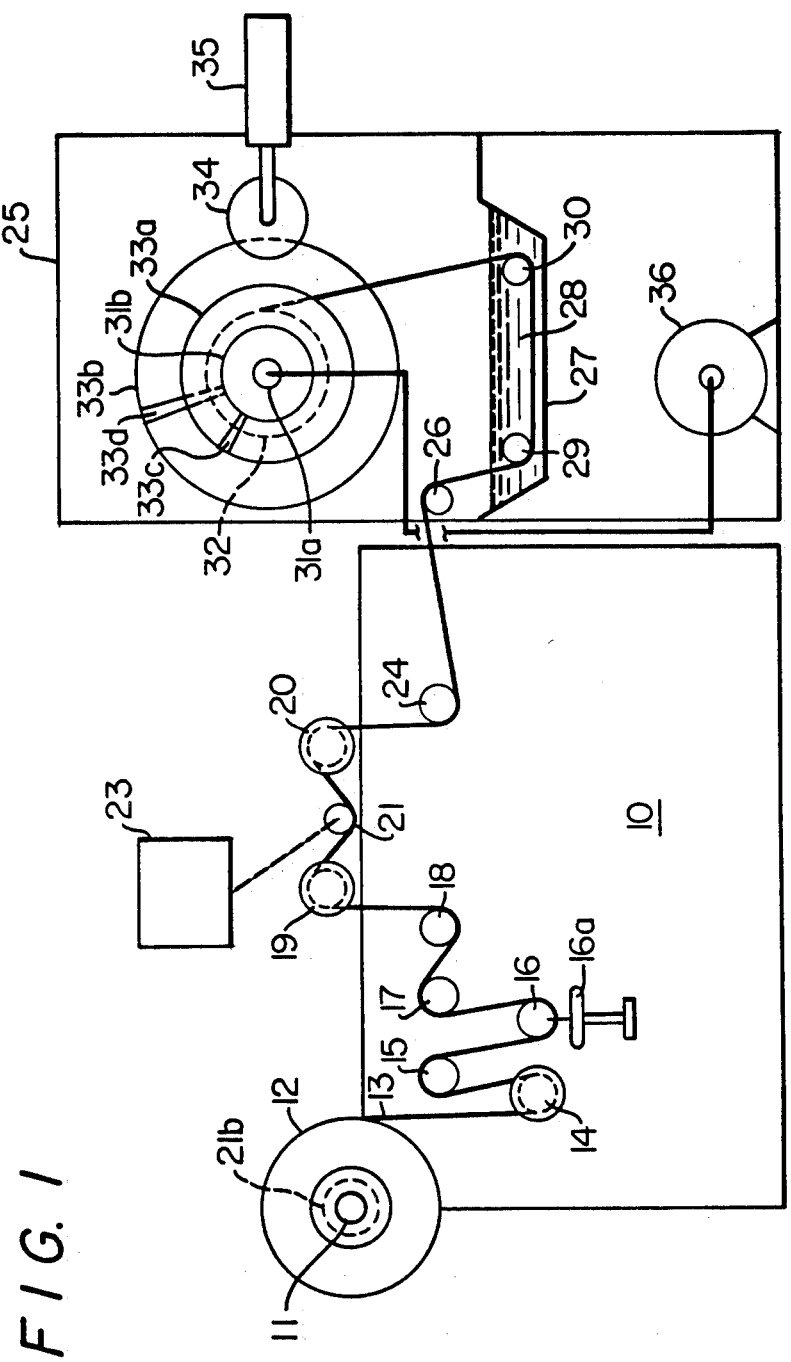
FIG. 1 is a schematic view of the apparatus of the invention suitable for practicing this manufacturing method for liquid smoke impregnated fibrous cellulosic food casing, using a liquid smoke dip tank as the coating zone.

Liquid smoke often is a solution of natural wood smoke constituents prepared by burning a wood, for example, hickory or maple, and capturing the natural smoke constituents in a liquid medium such as water. Alternatively, the liquid smoke to be used may be derived from the destructive distillation of wood, that is, the breakdown or cracking of the wood fibers into various compounds which are distilled out of the wood char residue. Aqueous liquid smokes are generally very acidic, usually having a pH of 2.5 or less and a titratable acidity of at least 3%.

Reference to the term "smoke coloring and smoke flavoring constituents", as used throughout this specification with respect to liquid smoke compositions and casings used in the method, is intended to refer to, and should be understood as referring to, the smoke coloring and flavoring and odor constituents derived from liquid smoke solutions in their commercially available form.

The liquid smoke used in the method is derived from natural wood smoke constituents. The source liquid smoke is generally produced by the limited burning of hardwoods and the absorption of the smoke so generated, into an aqueous solution under controlled conditions. The limited burning keeps some of the undesirable hydrocarbon compounds or tars in an insoluble form, thereby allowing removal of these constituents from the final liquid smoke. Thus, by this procedure, the wood constituents previously considered desirable by the manufacturer of the liquid smoke are absorbed into the solution in a balanced proportion and the undesirable constituents may be removed.

TABLE A

Commercially Available Liquid Wood Smokes

| Manufacturers Designation | Total Acid Content[d] % | Total Solid % |
|---|---|---|
| Royal Smoke AA[a] | 11.5–12.0 | 10.2 |
| Royal Smoke A[a] | 10.5–11.0 | 9.0 |
| Royal Smoke B[a] | 8.5–9.0 | 8.8 |
| Royal Smoke 16[a] | 10.0–10.5 | 17.6 |
| Charsol C-12[b] | 12.0–12.5 | 8.3 |
| Charsol C-10[b] | 11.5 | not reported |
| Charsol X-11[b] | 10.0 | 5.8 |
| Charsol C-6[b] | 6.7 | 4.8 |
| Charsol C-3[b] | 3.6 | 1.0 |
| Smokaroma | | |
| Code - 12[c] | 12.0 | 10.5 |
| Code - 10[c] | 10.2 | 5.1 |
| Code - S[c] | 8.0 | 2.4 |
| Code - 6[c] | 6.2 | 1.9 |

[a]Griffith Laboratories, Inc. 12200 South Central Avenue, Alsip, IL
[b]Red Arrow Products Co., P.O. Box 507, Manitowoc, WI
[c]Meat Industry Suppliers, Inc. 770 Frontage Road, Northfield, IL
[d]Also referred to as "Total Acidity"

The resultant liquid smoke solution still contains a significant concentration of tars, because the manufacturers and users of the liquid smoke consider the dark colored tars to be necessary from the standpoint of imparting smoke color, odor and flavor to foodstuffs. Table A lists several commercially available tar-containing liquid wood smokes along with several characteristics deemed important for purposes of this invention (discussed hereinafter). The apparatus and method for manufacturing typical liquid smokes of the preferred type is more fully described in U.S. Pat. No. 3,106,473 to Hollenbeck and 3,873,741 to Melcer et al.

In a preferred embodiment, the liquid smoke composition used in the practice of this invention has a total acid content of at least about 7 weight percent, and most preferably a total acid content of at least about 9 weight percent. Total acid content is a qualitative measure of the tar content and staining power of liquid wood smokes used by manufacturers. In general, higher total acid content means higher tar content. The same is true of the total solids content of liquid smoke. The procedures used by liquid wood smoke manufacturers to determine total acid content (total acidity) and total solids are as follows:

Determination of Total Acid Content for Liquid Smoke

1. Weigh accurately about 1 ml. of liquid smoke (filtered if necessary) in a 250 ml. beaker.
2. Dilute with about 100 ml. of distilled water and titrate with standard 0.1N NaOH to a pH of 8.15 (pH meter).
3. Calculate the total acid content as percent by weight of acetic acid, using the following conversion:

1 ml. 0.1000 N NaOH = 6.0 Mg. HAc

Determination of Total Solids

1. Pipet about 0.5 ml. of liquid smoke on a tared 6 cm aluminum moisture dish fitted with a dried Whatman No. 40 filter paper disc, and weigh accurately. The liquid smoke should be clear, and filtration is used to insure this condition.
2. Dry for two hours at 105° C. in a forced draft oven, or for 16 hours at 105° C. in a conventional oven.
3. Cool to room temperature in a desiccator and weigh.
4. Calculate the total solids as percent by weight of the liquid smoke.

The liquid smoke used in the method may also contain other ingredients which may be suitably used in treating a tubular food casing, to which the smoke constituents are applied, e.g., glycerine and/or propylene glycol which may be used as humectants or softening agents, and the like.

Other ingredients which are normally used in the manufacture of, or for further treatment of the food casings, e.g., peelability agents and mineral oil, may also be present on the casing if desired.

In particular, agents for improving the peelability of the casings from food products such as hams and sausages, e.g., beef rolls, turkey rolls, bolognas and the like, may be optionally coated on the internal surface of the casings before or after the external liquid smoke treatment method of this invention and before or during shirring. Such peelability enhancing agents include, but are not limited to, carboxymethyl cellulose and other water soluble cellulose ethers, the use of which is disclosed in U.S. Pat. No. 3,898,348 issued Aug. 5, 1975 to Chiu et al., the disclosure of which is incorporated herein by reference; "Aquapel", a Hercules, Inc. trademarked product comprising alkyl ketene dimers, the use of which is further disclosed in U.S. Pat. No. 3,905,397 issued Sept. 16, 1975 to H. S. Chiu, the disclosure of which is incorporated herein by reference; and "Quilon", an E.I. DuPont de Nemours Co., Inc. trademarked product comprising fatty acid chromyl chlorides, the use of which is further disclosed in U.S. Pat. No. 2,901,358 issued Aug. 25, 1959 to W. F. Underwood et al., the disclosure of which is incorporated herein by reference.

The peelability enhancing agent may be applied to the internal surface of the tubular food casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827 to Bridgeford.

The method is also suitable for adding liquid smoke to a printed casing, e.g., a casing having an insignia, trademark, lettering, and the like printed thereon, having smoke coloring and smoke flavoring constituents incorporate therein. Exemplary printed casings are disclosed in U.S. Pat. No. 3,316,189, the disclosures of which are incorporated herein by reference.

In a preferred embodiment of the method sufficient liquid smoke is impregnated into the flat casing to provide an absorptive index in the range of from 0.15 to about 1.5 and most preferably between about 0.4 and about 1.0. This is more fully discussed in my copending application Ser. No. 301,275, now U.S. Pat. No. 4,377,606, all the teachings of which are incorporated herein by reference. "Absorptive index" is a measure of the casing's ability to impart smoke color to encased foodstuff, and for purposes of this invention is determined by the following procedure.

Absorptive Index

Two square inches of liquid smoke-treated casing are placed in 10 ml. of methanol. After one hour of soaking time, the methanol has extracted all of the smoke components out of the casing, and the ultraviolet absorption value of the resulting smoke component-containing methanol is determined at 340 nm. This value is defined as the absorptive index of the casing. A 340 nm. wave length was selected because spectroscopy measurements with many liquid smoke extracts from smoke treated casings indicate greatest correlation with smoke loading in this region.

The casings useful in the practice of this invention are tubular in form, of the cellulosic type, and they have a fibrous reinforcing web embedded in the casing wall. Also, the casings used herein are conventionally known as "dry stock casings" because they have been previously dried to a water content of from about 3 to about 8 weight percent water, based on the total weight of casing including water. Relative to water content, the other type of casing is conventionally known as "gel stock casing" because it has not been previously dried. Gel stock casings are not suitable for practicing this invention because I have found that the use of as-is aqueous liquid smoke results in the formation of a tarry deposit on the rolls following the liquid coating zone, and in the rewind zone. This tarry deposit on the rolls eventually forces shutdown of the system. There is no tarring of significance when dry stock casing is used in the present method.

The casings used in the practice of this invention require a fibrous reinforcement in the casing wall in order to provide for flat width stability when the casing is impregnated with liquid smoke by the present invention. It has been found that cellulosic casing which does not have a fibrous web in the casing wall becomes irregular in flat width when treated by the inventive method. Accordingly, the casings used in this invention are cellulosic fibrous casing.

Many types of casings are peeled from the encased food products, either by the food processor before sale to the customer, or by the consumer. However, the "dry sausage" type fibrous casing may also be used herein and it typically remains adhered to the processed food products for sale to the consumer.

A common feature of many processed food products, particularly meat products, is that the mixture of ingredients constituting the food product, called an emulsion, is stuffed into a casing under pressure, and further processing of the food product, such as smoking, curing and the like steps, are carried out on the encased product. The food product may also be stored and shipped encased in its casing, and, in fact is often so handled right up to and sometimes through retail sales in the case of the large size fibrous food casings having stuffed diameters of about 40 mm up to about 160 mm, or even larger.

Until fairly recent times, large size fibrous casings have been supplied to the food processor mostly in flattened condition, cut to predetermined lengths of from about 0.6 m to about 2.2 m, but improvements in shirring and packaging techniques, and the increased use of automatic stuffing equipment lately has been and is increasing the demand for large size fibrous casings in the form of shirred sticks of up to about 60 m and even longer of continuous casing.

In the preparation and use of cellulosic fibrous food casings, the moisture content of the casings is of considerable importance. To facilitate shirring operations on these casings without damaging them, it is generally necessary that they be of a relatively low water content, usually in the range of from about 11% to about 17% by weight of total casing, a moisture content which is relatively low compared to the moisture content required when the casing is used for food stuffing. To permit ready stuffing of the compressed shirred casing without breaking of the casing during the stuffing operation, shirred fibrous casings having an average moisture content of between about 17% to about 35% are required. This lower limit in the range of moisture content is important during stuffing, because excessive breakage of the casing has been found to occur at lower moisture contents when stuffing to full recommended casing diameter.

Here it is of importance to note that the term "moisture content" as used throughout this specification and in the appended claims with reference to the cellulosic casings of the invention, is intended to refer to and should, unless otherwise specified, be understood as referring to:

the weight percent of water or moisture in the casing based on the total weight of the casing. Even if large size casings are to be used in the flattened form for stuffing without conversion to the shirred stick form, such large size casings are quite stiff in the dry stock form, and are softened for stuffing operation by soaking in water, usually for about an hour, resulting in full moisture saturation of the casing. Because of this full saturation soaking just prior to use in stuffing operations, the need to supply such casings with any predetermined controllably added moisture content for stuffing operations has not been necessary or even advantageous. The recent wider use of automatic high speed high pressure stuffing equipment for products employing large size tubular food casings, and the consequent increased demand for such casings in shirred form as compared to the short, flattened lengths heretofore used, has brought focus to bear on and has emphasized the problems of moisturizing such casings by soaking just prior to use. Moreover, the need for greater control of all aspects of the manufacture and use of large size food casings has been and is increasing. For example, the uniformity of dimensions of stuffed food casings and food products processed therein has become an increasingly important commercial requirement, and casing moisture content has been found to be a factor in control of uniformity, as well as in meeting the continuing need to readily, and economically stuff the casings without damage or breakage thereof, and more importantly, to permit the stuffing of a given casing to its manufacturer's and trade designated fully stuffed size with consistent accuracy and reproducibility of results.

A commercially practiced solution to the moisture problem is for the casing manufacturer to premoisturize the casing prior to shirring and/or stuffing so that the casing contains preferably between about 17% and 35% by weight water based on the total fibrous casing weight. It may then be shirred or reeled in the flat form in the "no soak" form, ready for stuffing. Also, to prevent mold growth in the cellulosic fibrous casing during storage of the casing, an antimycotic agent such as propylene glycol is incorporated into the casing. As for example described in copending application Ser. No. 157,008 of Ellis et al., said application being assigned to the same assignee as the instant application, propylene glycol is provided in an amount of at least about 4% by weight of dry cellulose and also sufficient to comprise at least about 5% by weight of the liquid components in the casing.

In a preferred embodiment of the method, the liquid smoke used in the coating zone provides sufficient antimycotic effect by itself to prevent mold growth, thereby eliminating the need for a separate antimycotic agent such as propylene gylcol. Also, the aqueous liquid smoke has sufficient moisture to impregnate the casing with water to provide a moisture content between about 17 and 35 weight % based on the total casing weight, and to simultaneously impregnate the casing with sufficient liquid smoke to provide an absorptive index of at least about 0.15. Accordingly, this method provides a liquid smoke impregnated fibrous reinforced cellulosic food casing which is free of mold growth during storage, and which may be stuffed to full size with foodstuff for processing to yield a food product, having satisfactory smoke color, odor and flavor.

The discovery that smoke is such an effective antimycotic agent that it can prevent mold growth in a fully soaked premoisturized casing, as described in my previously referenced U.S. Pat. No. 4,377,606 makes it attractive to use the method to provide premoisturized fibrous casing at high levels of moisture. To attain high levels of moisture by the inventive method, a commercially available liquid smoke solution containing a low total acid content and a low total solids content should preferably be used. The reason for this preference is that it has been found that when a liquid smoke solution containing high total acid and high total solids is diluted with additional water, precipitation of tars from the aqueous liquid smoke solution occurs. Additionally, when a very high moisture level is desired, it may be advantageous to prestick the fibrous casing before the casing is impregnated with liquid smoke by the inventive method. The resulting presticking holes allow the aqueous liquid smoke to enter the inside of the flattened fibrous casing and thus raise the moisture level, as a portion of the impregnating liquid smoke is in direct contact with the inner surfaces of the casing wall. A preferred method of presticking is disclosed in U.S. Pat. No. 3,779,285 to Sinibaldo.

As previously explained, the liquid smoke impregnated rewound reeled casing product from this method may, but need not, be shirred prior to stuffing with foodstuff. The reeled product most preferably has between about 17 and about 35 weight % water, based on total casing weight. It has been discovered that higher moisture contents tend to create high shirring waste because of difficulty in pulling the liquid smoke impregnated flat casing with high moisture content, through the shirring apparatus.

The method may be practiced with commercially available rewinding machines modified to accept a single-dip liquid smoke application tank, along with certain internal modifications discussed hereinafter. FIG. 1 is a schematic representation of apparatus suitable for such practice. In particular the modified rewind machine 10 includes first rotatable unwind shaft 11 with a roll 12 of fibrous reinforced dry stock cellulose food casing thereon in the flat reeled form. Flat stock casing roll 12 is engaged on first shaft 11 by well-known means, such as an air chuck (not illustrated).

Flat casing 13 is laced through the rewind machine 10 by pulling the first end of same under primary edge guidance roller 14, then over tachometer feedback roll 15 and then around the underside of tension dancer roll 16 positioned at about the same elevation as primary edge guidance roller 14. Next the flat casing 13 is pulled over first idler roll 17 positioned at about the tachometer roll elevation, and thence under second idler roll 18 located at about the same elevation as first idler 17. Now the flat casing 13 is drawn upward for positioning over longitudinally spaced secondary edge guidance rollers 19 and 20, preferably at the same elevation. Tension, sensing roll 21 with strain gauge sensors (not shown) on each end is positioned intermediate the two guidance rollers 19 and 20 so as to downwardly displace the flat casing therebetween. The required first highest restraining torque is applied by an unwind brake 21b coacting with unwind shaft 11 and controlled by a dancer roll-operated regulator 16b at the dancer roll 16. The tension on restrained flat casing 13 is sensed by means of the strain gauge sensors at roll 21 and the tension signal is transmitted to a tension readout means 23. Tension readout 23 is preferably a recorder device, since the recorder allows an average tension to be more easily determined.

The tensioned flat casing 13 is then transferred by third idler roll 24 into liquid containment enclosure 25 by movement over fourth idler roll 26.

Next, the tensioned flat casing web 13 is downwardly drawn into liquid smoke dip pan 27 by means of longitudinally spaced first dip roller 29 and second dip roller 30 which are at the same elevation. The tensioned flat casing outer surface is coated with liquid smoke therein at liquid smoke coating zone 28 and then upwardly withdrawn by engagement on second rotatable shaft 31a and roll core 31b, the latter being retained on shaft 31a by holding means such as an air chuck (not illustrated). During operation, a flat rewound second casing roll 32 forms thereon as a rewind zone, and side 33 and 33b are mounted on opposite ends of shaft 31a provide edge guidance and alignment of succeeding casing layers. The flat casing contact (immersion) time in dip pan 27 is very short, e.g. 0.2 second. It is less than that required for the liquid smoke to significantly impregnate the casing wall but sufficient for coating of the liquid smoke as an evenly distributed liquid film between adjacent layers of the second roll.

During the second roll rewinding and the first roll unwinding, the restraining torque applied by unwind brake 21b is progressively decreased to maintain the aforementioned constant web tension as the first roll diameter diminishes. Also, during this period the rewinding flat casing is maintained in the rewinding zone for sufficient duration for the liquid smoke film to impregnate the casing wall. By way of illustration, at a casing speed of 600 ft/minute and a roll length of 2400 feet, the minimum time for flat stock to remain on the second roll for substantial smoke absorption is about 5 minutes. When the second or trailing end of the flat casing is released from first shaft 11, this untensioned end is pulled through liquid coating zone 28 and a liquid smoke film is formed thereon, after which this coated trailing end becomes the outer portion of the second rewind roll 32. Rider squeeze roll 34 is in edge-to-edge alignment with rewound flat casing roll 32, but in a retracted out-of-contact position during formation of second roll 32. Now it is moved by means 35 against the entire edge-to-edge outer surface of second roll 32. The purpose of rider squeeze roll 34 is to squeeze the remaining excess liquid smoke from the rewound flat casing outer layers. The second roll 32 is then slowly revolved in order to provide for liquid smoke to be evenly distributed throughout the layers of casing. As the reel continues to spin, the liquid smoke impregnates the wall of the casing. For this purpose, motor 36 is mechanically joined by unillustrated means (for example a shaft) to second shaft 31a, and provides slow spin movement of liquid coated rewound casing second roll 32 simultaneously with rider squeeze roll 34 contact. During this liquid smoke absorption period, the second shaft speed may, for example, be about 50 to about 60 rpm.

The rewound casing roll 32 continues to slowly rotate for a time sufficient for the liquid smoke film, which is held between the adjacent casing layers, to substantially impregnate the wall of the casing. Substantial impregnation has been achieved when the surface of the casing is dry to the touch. That is to say, the casing surface may feel moist, but there is no free liquid on the surface. In general, substantial impregnation occurs after five to ten minutes of slow rotation.

Since the dip zone contact time of the tensioned flat casing is less than that required for the excess liquid smoke to penetrate into the casing wall, a portion of the excess liquid smoke descends in a falling film mode back into dip pan 27 from the rising tensioned flat casing web before it reaches rewound second roll 32. Another portion of the excess liquid smoke is allowed to drain from the spinning rewound flat casing roll 32 and spinning side plates 33a, and 33b, each side plate having multiple radial drain passages 33c and 33d, respectively, such as for-liquid smoke outward radial flow to dip pan 27. It is to be noted that the liquid level in dip pan 27 is held constant during the coating operation. The liquid smoke is recirculated by a conventional flow circuit and liquid smoke is added as needed.

Two different diameters have been used for the rewind core 31b: 8 inches and 14 inches. In each instance the liquid smoke loadings of the casing throughout the rewound second roll were determined. It was discovered that the rolls formed on the 14-inch diameter rewind core provided more uniform liquid smoke loading than the rolls formed on the 8-inch diameter rewind core. This is probably because the cellulosic casing swells as liquid smoke absorption progresses, and results in greater compression of layers nearest the smaller diameter core. On this basis, it is preferred to use relatively large diameter rewind cores in the practice of this method.

By way of illustration, the present method has been successfully practiced to produce liquid smoke impregnated fibrous reinforced flat casings having dry flat widths in the range of about 2 to 12 inches using a modified Model 142 rewind machine purchased from the Stanford Division, Wood Industries, Salem, Ill., as schematically illustrated in FIG. 1 and already broadly described. The actual modifications were in two major functional areas: the means to maintain constant tension on the flat casing as it moves through the liquid smoke coating zone to the rewind zone, and the means to provide the precise edge guidance needed to produce a reeled product with uniform liquid smoke loading. These modifications were as follows:

A. Tension Control (1) The steel dancer roll 16 shaft and pivot arm (not illustrated) were removed and lighter weight aluminum replacements were installed to decrease the amount of mass in the dancer system. This was necessary to increase the sensitivity of the dancer system to small fluctuations in flat casing web tension.

(2) The heavy dancer arm counter weight was replaced with an air cylinder to not only reduce the dancer system mass, but also to make tension adjustments easier for the operator. With the air cylinder, dancer arm loading and thus machine tension can be changed by adjusting an air regulator, which changes the air pressure to the dancer arm.

(3) The unwind shaft 11 pneumatic brake (which receives an air pressure signal from the dancer arm cam actuated regulator) used to provide the restraining torgue on the unwind shaft 11 was too large (too much brake surface area) for the desired flat casing web tension levels. The brake was replaced with a smaller unit which allowed operation in the desired 7 to 23 lb. total web tension range for the machine.

B. Casing Edge Guidance

The casing edge guidance system supplied by the manufacturer was not adequate to meet the needs of the present method. It was observed that exposed edges result in deeper liquid smoke color and higher coating levels, thereby yielding an impregnated casing having undesirable color streaks. For this reason, a hydraulic secondary edge guide system (including elements 19-21) was installed downstream of the primary guidance roller and tension dancer arm to provide that adjacent layers of casing on the roll are substantially congruent to provide edge to edge contact. The maximum deviation of one edge from an adjacent edge was set at 1/32 inch. This edge-to-edge deviation limitation was sufficient to produce substantially uniformly colored liquid smoke-impregnated flat casing.

The sequence of the FIG. 1 machine operation in the practice of this method is as follows:

(1) The first roll 12 of dry stock cellulose casing is mounted on first rotatable shaft 11 and engaged by an air chuck.

(2) A core 31b is mounted on the second rotatable shaft 31a in the rewind zone.

(3) The first end of roll 12 is laced through the apparatus as illustrated in FIG. 1 and secured to core 31b. Outer side plate 33a is slid into position at the outer edge of core 31b, thereby confining web 13 between stationary side plate 33b and movable outer side plate 33a.

(4) The flat casing web tension is set by adjusting the dancer arm cam actuated regulator 16a and the amount of counterweighting provided by the dancer arm air cylinder. The casing speed is set by adjustment of the speed potentiometer.

(5) The liquid containment enclosure 25 access door is closed, the liquid smoke dip pan is filled, and the apparatus is started.

(6) The flat casing accelerates over a period such as 15 seconds to the desired full speed such as 600 feet per minute.

(7) The dip pan 27 liquid smoke level is maintained by a recirculation pump.

(8) The second or trailing end of the flat casing releases from the core attached to first shaft 11 when the first roll 12 has been depleted. This causes a limit switch to be actuated to signal the automatic devices to initiate steps (9) and (10).

(9) After liquid smoke coating of the flat casing trailing end, the liquid smoke is automatically drained from dip pan 27 into a reservoir by a control-actuated drain valve.

(10) The signal used to initiate draining of the liquid smoke from the dip pan is also used to actuate means 35 for moving rider squeeze roll 34 from its retracted position to contact the rotating roll 32. Means 35 is an air cylinder. Rider roll 34 presses against the outer surface of rotating roll 32. At the same time the drive assembly for motor 36 is actuated, as for example by a pneumatic clutch, and rotates the roll 32 at from about 50 to 60 RPM. This combination of rider roll and slow reel spinning serves to press out any heavy pockets of liquid smoke trapped between untensioned casing outer layers. As previously explained, the reason for this feature is that the trailing end of the liquid smoke-coated flat casing is not added to the second reel 32 under tension, and contains a greater excess of entrapped liquid smoke than the underlying layers which were wrapped under tension.

(11) After a predetermined period of rider roll contact and slow spinning, such as 10 minutes, the liquid smoke has substantially impregnated the casing wall through the entire roll and the apparatus is stopped.

(12) The outer side plate 33a is removed, and the liquid smoke-impregnated roll 32 is removed from the second shaft 31a. The roll is preferably stored in its horizontal position (core axis is vertical) to minimize potential liquid drain-down and thereby to avoid potential non-uniformity in the smoke impregnated casing article.

The invention will be more clearly understood by reference to the following examples which are set forth as being merely illustrative of the invention and which are not intended, in any manner to be limitative thereof.

EXAMPLE I

A series of tests was performed with the previously described modified Stanford apparatus, in which fibrous reinforced cellulosic food casings of different dry flat widths ("DFW") were impregnated with Royal Smoke AA and Charsol C-12 liquid smokes under different casing tensions (lbs/inch of casing width) to achieve loadings in the range of 25±5 milligrams of liquid smoke solution per square inch of casing outer surface area. In each instance, the casing speed was about 600 feet per minute and it was wound on a 14 inch core. The rotational speed of the liquid smoke treated roll during the rider roll contacting period was about 60 rpm, and this period lasted about 10 minutes. The data from these tests is summarized in Table B and plotted as FIG. 3.

TABLE B

| Dry Flat Width (Inches) | Casing Tension to Width Relationship | | Coating Wt. (mgs/in$^2$) |
|---|---|---|---|
| | Tension | | |
| | Total (lbs) | lbs/inch width | |
| 3.81 | 9.0 | 2.36 | 20.1 |
| 4.43 | 10.0 | 2.26 | 24.0 |
| 6.33 | 13.5 | 2.13 | 22.5 |
| 6.50 | 13.7 | 2.12 | 24.7 |
| 6.92 | 14.5 | 2.10 | 20.7 |
| 8.29 | 16.5 | 2.00 | 21.2 |
| 9.00 | 17.2 | 1.92 | 24.8 |

Figure 3:
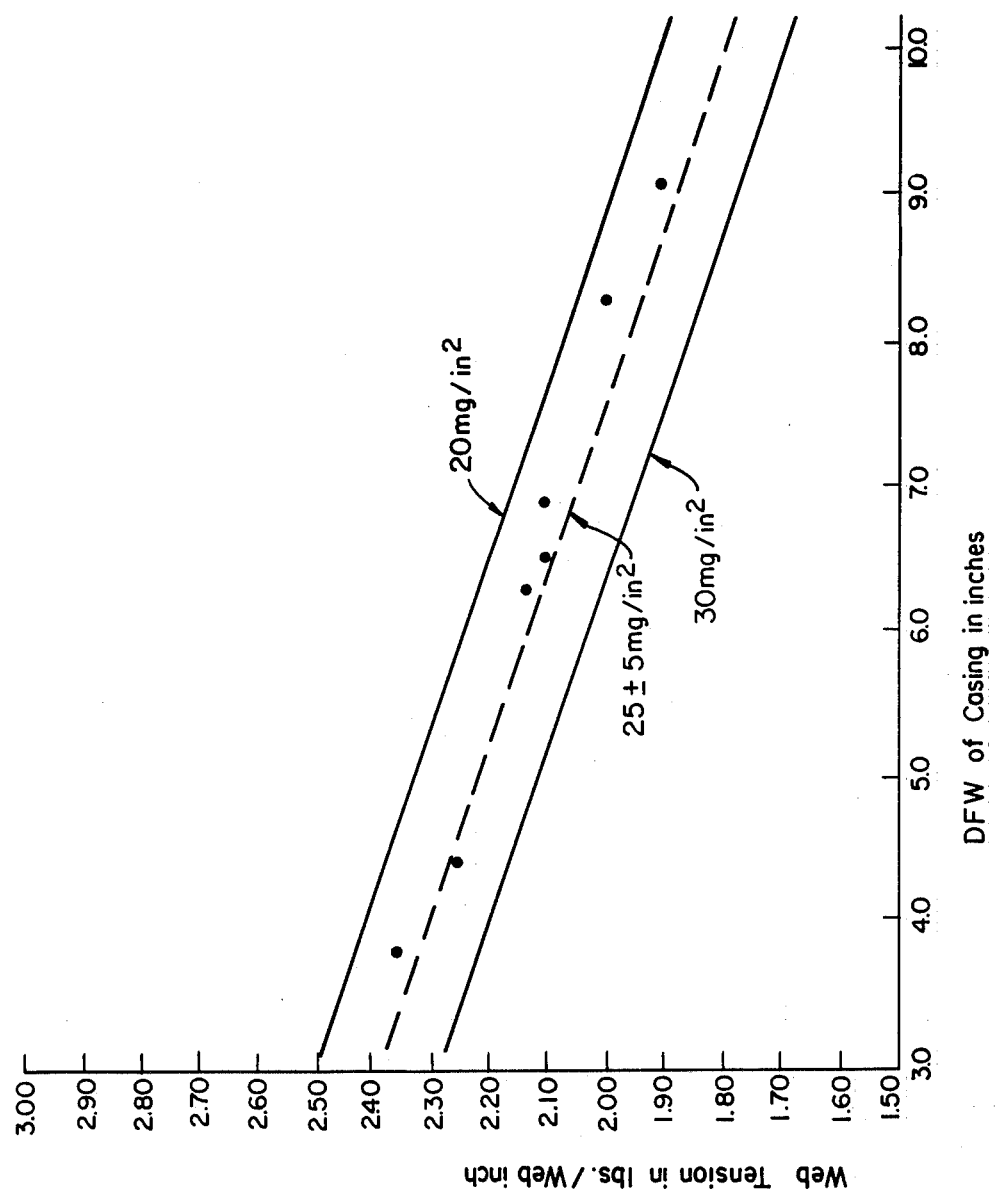
FIG. 3 is a graph showing the relationship between casing tension (lbs./inch flat casing width) and flat casing width, to achieve loadings of Royal Smoke AA liquid smoke in the range of $25 \pm 5$ mg/in$^2$ of casing outer surface area by this method, using the FIG. 1 type of apparatus.

Table B and FIG. 3 shows that the total tension increases with casing size to yield an average liquid smoke coating weight in a desired level. However, the tension per unit casing width decreases with increasing casing size to achieve a particular liquid smoke coating weight. It is doubtful that the relationship of casing tension to width is linearly proportional to casing flat width since the actual form of the casing cross section is a rather stiff and flattened tubing with two folded-over edges. It is suspected that the casing edges have an influence on the required casing tension, but this edge effect is not truly understood. This edge effect thereby appears to influence the amount of liquid smoke loading on the casing and there may be a relationship between the liquid smoke loading and the ratio of the edge dimension to casing flat width, but this relationship is not understood and has not been verified.

FIG. 3 illustrates the type of relationship which the practitioner can develop for his own coating and rewinding system to facilitate practice of the instant method with different size casings to achieve a liquid smoke loading within a particular range, using the same type of liquid smoke. In this instance, the experimental data from Example I generated using the previously described modified Stanford apparatus have been used as a basis for extrapolation to form an area of liquid smoke loading in the range of 20 mg/in$^2$ (lower limit) to 30 mg./in$^2$ of casing surface area (upper limit) for liquid smokes such as Royal Smoke AA and Charsol C-12 having a total acid content of about 11.5–12.5 wt. %. That is, for loadings of such liquid smoke exceeding about 30 mg/in$^2$ casing surface with this particular apparatus, the casing web tension expressed as lbs/inch DFW should be lower than indicated by the area for a particular DFW. Conversely, for loadings of such liquid smoke below about 20 mg/in$^2$ of casing surface, the casing web tension should theoretically be higher than indicated by the area for a particular DFW. Unfortunately, on the specific modified Stanford apparatus described previously, it was not possible to obtain sufficiently high tension to verify this theoretical expectation, and the lowest liquid smoke loadings achieved with this apparatus were about 20 mg/in$^2$ of casing surface. Other coating and rewinding systems, however, may achieve higher casing web tensions sufficient to produce liquid loadings below 20 mg/in$^2$ of casing surface. In those systems where the tension cannot be raised high enough to achieve lower loadings, liquid smokes having a lower acid content may be used at their limiting lower loading to achieve a coated casing having a lower capability to impart smoke color, odor and flavor to a foodstuff encased therein.

For the modified Stanford apparatus used in my work, the equation for the 20–30 mg. loading of liquid smoke of 11.5–12.5 wt. % total acid content represented by the FIG. 3 band is as follows:

$$Y = -0.086 X + C$$

where
X = dry flat width of casing, inches.
Y = required casing tension, lbs./inch of casing width.
C = at least 2.65

By way of illustrating use of equation (1), assume I wish to use a fibrous reinforced cellulosic food casing having a DFW of about 7 inches and to impregnate it with 20–30 mg/inch$^2$ of Royal Smoke AA in the casing wall using the aforedescribed apparatus. Equation (1)

indicates that Y should be $-(0.086)7+2.65=2.05$ lbs/inch of casing width. The minimum total web tension should then be $2.0(7)=14.3$ lbs. on my modified Stanford apparatus. Those skilled in the art can readily calibrate their own liquid smoke coating and rewinding system to derive their own suitable curve similar to FIG. 3 and/or their own suitable equation.

EXAMPLE II

Still another series of tests with the modified Stanford apparatus was performed to illustrate the effect of flat casing tension on the coating weight (amount of solution impregnation or loading). The apparatus was operated at a speed of 200 ft/minute, and water was used as the impregnating liquid instead of liquid smoke. Since water and Royal Smoke AA have about the same viscosity and flow properties, the casing loadings obtained on these tests should be similar if Royal Smoke AA had been used instead of water. The fibrous casing had a dry flat width of 6.5 inches and it was rewound on an eight inch core. The rewind tension was also recorded automatically in these tests, and the water coating weight was estimated by weight difference in the flat reel, before and after treatment. The data from these tests is summarized in Table C.

TABLE C

| Effect of Rewind Tension Upon Coating Weight | | |
|---|---|---|
| Casing Speed | Rewind Tension | Water Loading |
| 200 ft/min | 20 lbs. (fairly steady) | 22.0 mg/in$^2$ |
| 200 ft/min | 15 lbs. (fairly steady) | 27.0 mg/in$^2$ |
| 200 ft/min | 10 lbs. (fairly steady) | 34.3 mg/in$^2$ |

Table C shows that the amount of liquid smoke loading in the casing increases as the applied rewind tension decreases. The reason for this relationship is that the rewind tension is a measure of how tight the rewind roll is wound, and relatively more liquid smoke is squeezed out from between adjacent layers of flat casing if the roll is wound more tightly (under greater tension).

EXAMPLE III

Still another series of tests with the modified Stanford apparatus was performed to illustrate the effect of flat casing speed on the coating weight (amount of solution impregnation or loading). The apparatus was operated at the two speeds of 100 ft/min. and 600 ft/min., and Royal Smoke B was used as the impregnating liquid. Another test was made using Charsol C-12 as the impregnating liquid smoke. The fibrous casing had a dry flat width of 6.4 inches and it was rewound on a 14 inch core. The rewind tension was automatically recorded in these tests, and the liquid smoke coating weight was estimated by weight difference in the flat reel, before and after treatment. The data from these tests is summarized in Table D.

TABLE D

| Effect of Casing Speed Upon Coating Weight | | | |
|---|---|---|---|
| Smoke Type | Casing Speed | Rewind Tension | Smoke Loading |
| Royal Smoke B | 600 ft/min | 23.5 lbs. | 27.6 mg/in$^2$ |
| Royal Smoke B | 100 ft/min | 22.5 lbs. | 38.5 mg/in$^2$ |
| Charsol C-12 | 600 ft/min | 21.0 lbs. | 28.5 mg/in$^2$ |

The test data of Table D show that the liquid smoke loading decreases with increasing speed. Even though the contact time in the coating zone is decreased, it is believed that the primary reason for this lower smoke loading is that the higher speed causes the roll to centrifugally spin off liquid smoke from the casing as it continually forms the outer layer on the spinning roll. This action causes less liquid smoke to be trapped between adjacent layers in the roll.

It was also observed during related tests that without changing the applied tension, the tension was increased by 2 to 3 lbs. as a result of increasing the casing web speed from about 100 ft./min. to 600 ft./min. This increase in tension is caused by the increase in frictional forces in the machine components at higher speed.

The casing speed not only affects the liquid smoke loading weight, but also the uniformity (i.e., mottling) of the resultant coating. The color uniformity is important because significant variations in the liquid smoke loading will result in corresponding variations in the color formed on the foodstuff surface while the latter is processed inside the casing. If the casing speed is sufficiently high through the coating zone, the liquid turbulence in the region of casing transfer to the rewind zone becomes so high that the casing assumes an undesired mottled appearance. This appearance may be minimized by using greater liquid smoke solution depth in the dip coating zone.

Another consideration is that if the liquid smoke treatment system is "in line" with other casing processing systems such as shirring, the casing speed should be the same as that of the other system to avoid buildup or shortage of liquid smoke impregnated roll casing for the next step. Since in commercial practice, other casing processing systems tend to be high speed, the liquid smoke treatment method of this invention should be relatively high, such as 600 ft/min., although lower speeds are satisfactory. Casing speeds should be maintained below about 1000 ft./min. in order to avoid the previously mentioned mottling problem.

In the preferred practice of this invention, the liquid smoke, the total acid content, the casing speed, rewind tension, coating zone contact time, rewind zone contact time, and rewind reel outer layer absorption time are all such that the resulting liquid smoke impregnated second reel has an absorptive index of at least about 0.15, and most preferably between about 0.4 and 1.0. These adsorptive indices provide a satisfactory degree of smoke color, odor and flavor in food products processed in the liquid smoke-impregnated casings, as for example, in ham and bologna.

This desired adsorptive index may be achieved with a liquid smoke having a relatively high total acid content, or with a relatively higher loading of liquid smoke having a lower total acid content. It has been found that the liquid smoke having a total acid content of at least about 11.5 wt. % (e.g. Royal Smoke AA and Charsol C-12), a liquid smoke loading of between about 20 and 30 mg/in$^2$ of casing surface provides an absorptive index of about 1.0. For purposes of comparison, Table E indicates the anticipated quantity of various liquid smokes which would be required to give a smoke color equivalent to that provided by 25 mg/in$^2$ of Royal Smoke AA on the same type of fibrous reinforced cellulosic casing by the present method.

TABLE E

| Comparison of Various Liquid Smokes | | | |
|---|---|---|---|
| Characteristic | Royal Smoke AA | Royal Smoke A | Royal Smoke B |
| Total Acid Content (wt. %) | 11.5–12.0 | 10.5–11.0 | 8–9 |

TABLE E-continued

| | Comparison of Various Liquid Smokes | | |
|---|---|---|---|
| Characteristic | Royal Smoke AA | Royal Smoke A | Royal Smoke B |
| Coating weight to give equivalent color (mg/in$^2$) | 25 | 40 | 47 |
| Karl - Fisher moisture of treated casing (% H$_2$O in total casing weight) | 22 | 36 | 41 |

With regard to higher levels of smoke loading than those listed in Table E, it will be recognized that some customers prefer a darker smoke color and/or a more pronounced smoke odor or flavor in foods, and that the effect of a particular level of liquid smoke treatment varies from food to food. For example, the color, odor and flavor effects of 25 mg/in$^2$ of Royal Smoke AA casing loading for processing bologna are different from the effects of the same casing loading used to process ham.

It should be noted however, that odor severity problems which arise during stuffing of the liquid smoke impregnated casings and during subsequent elevated temperature processing of the encased foodstuff may be an important limiting factor in liquid smoke treatment of food casings at higher levels. Odor is not a serious problem during the liquid smoke impregnation of flat casing because the coating zone and the rewind zone are enclosed, as illustrated in FIG. 1. Associated with and in direct proportion to odor concentration are skin-/eye irritations and handling problems which may arise during the stuffing operation, such as the staining of skin. It appears that in the stuffing operation, in the use of a smoke impregnated casing with low (4–5 mg/in$^2$) and mid-range (15–25 mg/in$^2$) smoke loadings, no distinctions can be made as regards odor severity. It appears that somewhat above this level people involved in the stuffing operation will begin to develop adverse physical symptoms unless special precautions are employed. However, if the liquid smoke impregnated casings are shirred, overwrapped and packaged in a gas-impermeable bag, higher loadings than 25 mg/in$^2$ of Royal Smoke AA or equivalent may be used without physical difficulty.

It should be noted that where the foregoing disclosure has discussed the achievement of a "substantially uniform distribution" of liquid smoke film between adjacent layers of casing and the "subsequent substantially uniform" impregnation of the casing walls by the liquid smoke components, all of this occurring on the product roll which is the second roll 32, I am not referring to an absolute uniformity. Notwithstanding the efforts to achieve absolute uniformity on the previously described modified Stanford apparatus, the physical limitations of the system were such that absolute uniformity could not be achieved. It was found that after impregnation had occurred, the level of smoke loading in the flat casing product on an eight inch core tended to be lower in the inner casing layers near the core than in the casing layers at the outer portion of the roll. For the fourteen inch core, the inner layers also tended to have a lower loading than the outer layers, but the difference in loading was less for the fourteen inch core. For both rolls, it was found that the smoke loading was variable throughout the intermediate layers of casing irrespective of the location where loading measurements were made for the layers.

However, in processing foodstuffs within the casings made by the method, it has been found that substantial color uniformity exists so long as the casing liquid smoke loading provides an absorptive index in the range of from about 0.15 to about 1.5. In general, substantial color uniformity is obtained within this range of absorptive index when the liquid smoke loading (mg of liquid smoke/in$^2$ of casing surface) is maintained within ±40% of the targeted smoke loading. However, it has been experimentally possible to maintain the liquid smoke loading variation on the modified Stanford apparatus within plus or minus 20% of the target loading. Accordingly, as used herein, the term "substantial uniformity" means that the liquid loading on the product casing roll does not vary more than ±40% of the target loading throughout the roll, and preferably does not vary more than ±20%.

Although the liquid smoke is preferably coated on the flat casing wall in the aforedescribed dip tank, other methods may be used for contacting liquid smoke and the casing in the coating zone. One such method is by roll coating, i.e., printing a film of liquid smoke on at least one surface of a flattened casing with a roll, such as an Anilox Roll. In such an operation the flattened casing can be coated on one side or both sides.

Another method for contacting the liquid smoke and the tensioned flat casing is by spraying the liquid smoke onto at least one surface of the tensioned flat casing. This may be done, for example, with the apparatus illustrated in the schematic drawing of FIG. 2, in which elements corresponding to elements in FIG. 1 are identified by the same reference number plus 100. The system for tensioning the flat casing during its transport from first shaft 111 to second shaft 131a may comprise, for example, the same modified Stanford apparatus elements described in relation to FIG. 1. Because of this similarity, only the elements differing from the FIG. 1 embodiment will be described. The liquid smoke is sprayed through slot-type nozzle 150 positioned over the entire edge-to-edge width of tensioned flat casing 113 as the latter is removed downwardly from roller 126 to second roll 132. The liquid film is formed on only one surface of flat casing 113, but when wrapped as part of second roll 132, the uncoated surface is in direct contact with a previously coated surface. Accordingly, the liquid smoke film penetrates the interior of the entire casing wall in the rewind zone.

The excess liquid smoke drained from the coating zone 128 and squeezed out by the tensioned casing layers from the rewind zone is collected in pan 151 and recirculated through bottom conduit 137 by pump 138 to return conduit 139 to spray nozzle 150.

Figure 2:
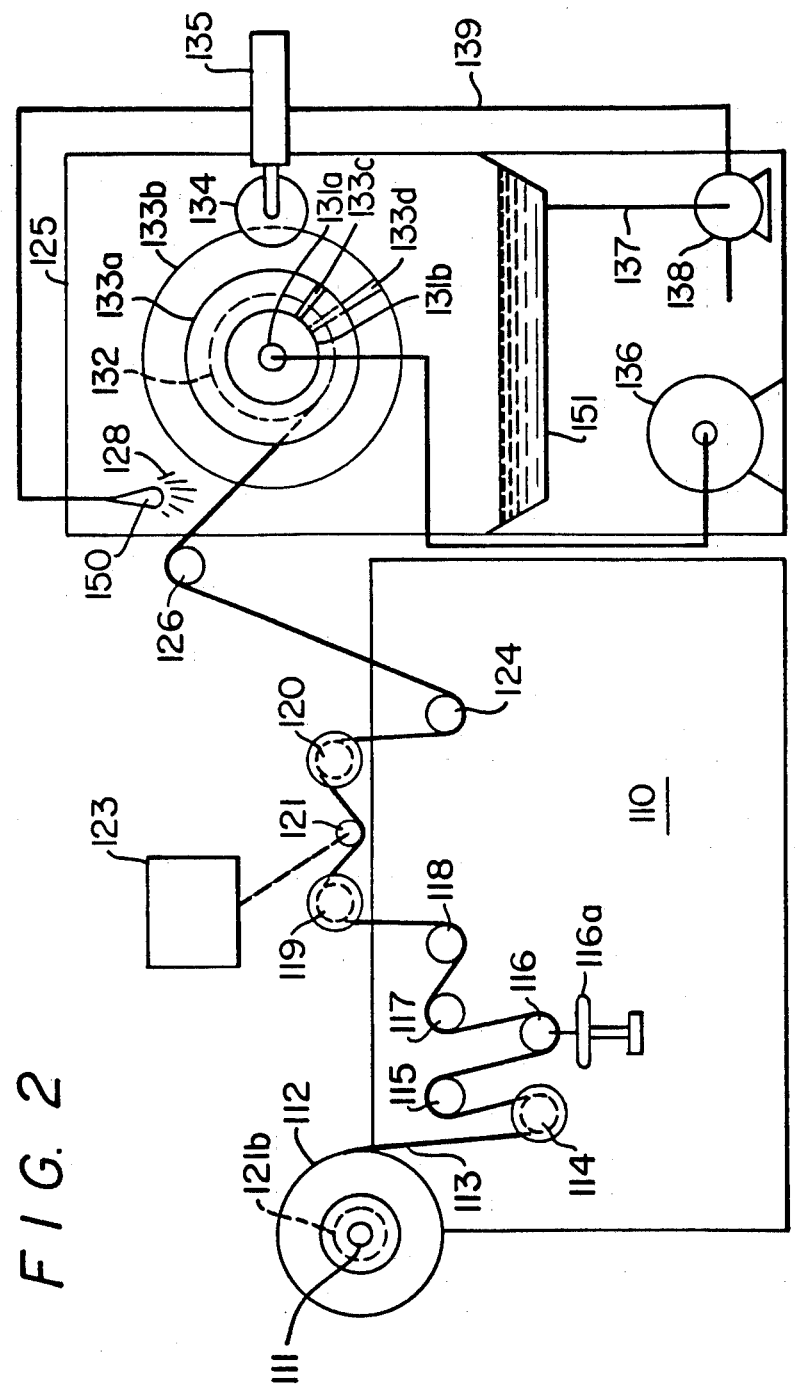
FIG. 2 is a schematic view of alternative apparatus for practicing this method using a liquid smoke spraying device as the coating zone.

The liquid spray-type coating system of FIG. 2 was successfully used to apply Royal Smoke AA liquid smoke at loadings in the range of from about 15 to about 25 mg/in$^2$ to fibrous dry stock cellulosic food casings of dry flat widths in the range of from about 6 to about 7 inches. In these tests, a casing speed of about 250 ft/min resulted in a reeled product of uniform color, but casing speeds of 450 ft/min and higher resulted in roll products of somewhat mottled appearance. One disadvantage of this system was the greater odor problem as compared with the FIG. 1 dip pan coating system, due to the atomized form of the spray mist.

Although preferred embodiments of this invention have been described in detail, it is contemplated that modifications thereof may be made and some features may be employed without others, all within the spirit and scope of the invention. For example, a roll of dry stock casing has been previously described as the feed source for the apparatus in the practice of this invention, but those skilled in the art will recognize that an in-line operation is possible wherein the dry stock casing is passed from the casing manufacturing system directly into the liquid smoke contacting zone without the use of a feed roll.

Additionally, it has been explained that the quantity of liquid smoke coating trapped between adjacent layers of casing on the roll is controlled by an inward radial force which is imposed across the entire width of the roll. Initially and during the majority of the rewinding of the smoke-contacted casing upon the take-up roll, this inward radial force is imposed upon the roll by the tension in the casing web which creates a radial force vector at the point where the liquid smoke coated casing tangentially is wound upon the roll to continuously form the outer layer of the take-up roll. At the end of the liquid smoke coating step, when the untensioned end of the smoke coated casing is being laid up on the take-up roll, the rider roller is brought into forceable contact with the outer surface of the take-up roll to provide the inward radial force and thus squeeze excess free liquid smoke out of the outermost casing layers, and thereby provide for uniform distribution of the liquid smoke film between adjacent layers throughout the roll. Those skilled in the art recognize that the rider roller could be kept in forceable contact with the outermost layer of casing on the roll throughout the entire winding of the liquid smoke contacted casing on the roll, and not merely during the ending moments when the untensioned end is laid up on the roll.

It should be understood that the invention is preferably practiced under controlled environmental conditions wherein the presence of minute metal particles is minimized. This is an important requirement since metal wear particles (primarily iron, copper, brass) in contact with the casing react with the liquid smoke coating, resulting in auto-oxidation and discoloration of the treated casing. The discoloration occurs only in the immediate area of the metal contamination and seldom exceeds 2–10 mm diameter in size. The materials of construction of the coating and rewinding apparatus is an important factor in minimizing minute metal particles. The materials of construction of the coating and rewinding system should be (1) of high wear resistance, and (2) nonreactive to the liquid smoke. It has been determined that certain metals and alloys are compatible with these stringent requirements. They are: certain aluminums, chrome plating, tin alloys, and certain stainless steels. Care must also be used in other steps of casing manufacture and handling to minimize the presence of minute metal particles.

The foregoing description of the present invention is to be taken as being illustrative and not in any sense of limitation, the limits of the invention being defined by the following claims:

What is claimed is:

1. Apparatus suitable for manufacturing a wood derived liquid smoke impregnated cellulosic casing, said apparatus comprising:
   (a) a first rotatable unwind shaft adapted to have mounted thereon a feed roll of cellulosic casing in flat web form, said roll of casing being engaged on said first shaft;
   (b) tension dancer roll means to control the tension on said casing as it contacts said casing;
   (c) an unwind roll brake co-acting with said first unwind shaft and controlled by a dancer roll-operated regulator at said tension dancer roll, said brake providing a restraining torque on said unwind shaft;
   (d) edge guiding means adapted to edge-align the casing for transfer of said casing to a liquid smoke contacting means;
   (e) a second rotatable rewind shaft mounted with a roll core for withdrawing said casing from said liquid smoke contacting means and for rewinding said casing on said roll core;
   (f) side plates mounted on said second rotatable shaft to provide edge guidance and alignment of succeeding casing layers during rewinding of said casing;
   (g) means to spin the rewound roll of casing when the feed roll is spent; and,
   (h) a rider squeeze roll adapted to be moved into edge-to-edge contact with said casing during the spinning of said casing.

2. The apparatus in accordance with claim 1 wherein said side plates have multiple radial drain passages.

3. The apparatus in accordance with claim 1 wherein said tension dancer roll is equipped with an air cylinder for making tension adjustments to said roll.

4. A coating apparatus for manufacturing a liquid impregnated absorbent material, said coating apparatus comprising:
   (a) tension dancer roll means to control the tension on said flat web of absorbent material;
   (b) a rotatable unwind means adapted to feed a roll of said absorbent material in flat web form, said unwind means including a brake co-acting with said unwind means and controlled by a dancer roll-operated regulator at said tension dancer roll, said brake providing a restraining torque on said unwind means;
   (c) edge guiding means adapted to edge-align said absorbent material to a liquid contacting means;
   (d) means for applying a liquid to said flat web of absorbent material;
   (e) means for rewinding said flat web of absorbent material on a rewind roll;
   (f) side plates mounted on said means for rewinding to provide edge guidance and alignment of succeeding layers of said absorbent material during rewinding thereof;
   (g) means for slowly spinning the rewound absorbent material on said rewind roll; and
   (h) rider squeeze roll means adapted to move into edge-to-edge contact with the outer layer of said absorbent material on said rewind roll when said feed roll is depleted.

5. A coating apparatus in accordance with claim 4 wherein said side plates have multiple drain passages.

6. A coating apparatus in accordance with claim 4 wherein said means for applying said liquid to said absorbent material comprises a dip tank.

7. A coating apparatus for manufacturing a liquid impregnated absorbent material, said coating apparatus comprising:
   (a) a rotatable unwind means adapted to feed a roll of said absorbent material in flat web form;
   (b) means to control the tension on said flat web of absorbent material;

(c) spray device means for applying a liquid to said flat web of absorbent material;
(d) means for rewinding said flat web of absorbent material on a rewind roll;
(e) means for slowly spinning the rewound absorbent material on said rewind roll; and
(f) rider squeeze roll means adapted to move into edge-to-edge contact with the outer layer of said absorbent material on said rewind roll when said feed roll is depleted.

8. Apparatus suitable for manufacturing a liquid impregnated web of absorbent material which comprises:
(a) tension dancer roll means to control the tension on said flat web of absorbent material;
(b) a rotatable unwind means adapted to supply a feed roll of absorbent material in flat web form, said unwind means including a brake co-acting with said unwind means and controlled by a dancer roll-operated regulator at said tension dancer roll, said brake providing a restraining torque on said unwind means;
(c) edge guiding means adapted to edge-align said web of absorbent material to a liquid contacting means;
(d) means for applying liquid to said flat web of absorbent material;
(e) rotatable rewind means adapted to rewind said flat web onto a rewind roll of said absorbent material;
(f) side plate means to provide substantial edge-to-edge alignment of succeeding layers of said flat web during the rewinding of said absorbent material onto said rewind roll;
(g) means to rotate said rewind roll when said flat web of absorbent material has been completely transferred from said feed roll to said rewind roll; and
(h) a squeeze roll adapted to move into contact with the outermost layer of absorbent material on the rewind roll, whereby excess liquid is squeezed from between outer layers of absorbent material on the rewind roll.

9. Apparatus of claim 8 wherein said side plate means have multiple radial drain passages.

10. Apparatus of claim 8 wherein said means for applying liquid comprises a dip tank.

11. Apparatus of claim 8 wherein said means for applying liquid comprises a spray device.

12. A coating apparatus for manufacturing a liquid impregnated absorbent material, said coating apparatus comprising:
(a) tension dancer roll means to control the tension on said flat web of absorbent material;
(b) a rotatable unwind means adapted to feed a roll of said absorbent material in flat web form, said unwind means including a brake providing a restraining torque on said unwind means;
(c) means for applying a liquid to said flat web of absorbent material;
(d) means for rewinding said flat web of absorbent material on a rewind roll;
(e) means for slowly spinning the rewound absorbent material on said rewind roll; and
(f) rider squeeze roll means adapted to move into edge-to-edge contact with the outer layer of said absorbent material on said rewind roll when said feed roll is depleted.

13. Apparatus suitable for manufacturing a liquid impregnated web of absorbent material which comprises:
(a) a rotatable unwind means adapted to supply a feed roll of absorbent material in flat web form, said means including a brake providing a restraining torque on said unwind means;
(b) tension dancer roll means to control the tension on said flat web of absorbent material;
(c) means for applying liquid to said flat web of absorbent material;
(d) rotatable unwind means adapted to rewind said flat web onto a rewind roll of said absorbent material;
(e) means to provide substantial edge-to-edge alignment of succeeding layers of flat web during the rewinding of said absorbent material onto said rewind roll;
(f) means to rotate said rewind roll when said flat web of absorbent material has been completely transferred from said feed roll to said rewind roll; and
(g) a squeeze roll adapted to move into contact with the outermost layer of absorbent material on the rewind roll, whereby excess liquid is squeezed from between outer layers of absorbent material on the rewind roll.

* * * * *

UNITED STATES PATENT AND TRADEMARK OFFICE
CERTIFICATE OF CORRECTION

PATENT NO. : 4,572,098

DATED : February 25, 1986

INVENTOR(S) : Herman S. Chiu

It is certified that error appears in the above-identified patent and that said Letters Patent is hereby corrected as shown below:

Abstract, line 3 "have a roll of casing," should read --have mounted thereon a roll of casing,--
Column 1, line 68 "succesful" should read --successful--
Column 6, line 54 "incorporate" should read --incorporated--
Column 6, line 63 "Ser. No. 301,275" should read --Ser. No. 301,276--
Column 10, line 41 "side 33 and" should read --side plates 33a and--
Column 10, line 42 "31a provide" should read --31a to provide--
Column 11, lines 36-37 "passages 33c and 33d, respectively, such as for-liquid" should read --passages, such as 33c and 33d, respectively for liquid--
Column 11, line 43 "3lb" should read --31b--
Column 19, line 29 "adJacent" should read --adjacent--
Column 22, line 33 "unwind means" should read --rewind means--

Signed and Sealed this

Twenty-fourth Day of June 1986

[SEAL]

Attest:

DONALD J. QUIGG

Attesting Officer

Commissioner of Patents and Trademarks